US012233565B2

(12) United States Patent
Hashimoto

(10) Patent No.: US 12,233,565 B2
(45) Date of Patent: Feb. 25, 2025

(54) RAZOR HEAD

(71) Applicant: KAI R&D CENTER CO., LTD., Gifu-ken (JP)

(72) Inventor: Kengo Hashimoto, Seki (JP)

(73) Assignee: KAI R&D CENTER CO., LTD., Gifu-ken (JP)

( * ) Notice: Subject to any disclaimer, the term of this patent is extended or adjusted under 35 U.S.C. 154(b) by 266 days.

(21) Appl. No.: 17/630,792

(22) PCT Filed: Sep. 10, 2019

(86) PCT No.: PCT/JP2019/035478
§ 371 (c)(1),
(2) Date: Jan. 27, 2022

(87) PCT Pub. No.: WO2021/019794
PCT Pub. Date: Feb. 4, 2021

(65) Prior Publication Data

US 2022/0314475 A1 Oct. 6, 2022

(30) Foreign Application Priority Data

Jul. 31, 2019 (JP) ................................. 2019-141292
Aug. 30, 2019 (JP) ................................. 2019-158480

(51) Int. Cl.
*B26B 21/40* (2006.01)
*B26B 21/22* (2006.01)

(52) U.S. Cl.
CPC ........ *B26B 21/4012* (2013.01); *B26B 21/222* (2013.01)

(58) Field of Classification Search
CPC ..... B26B 21/22; B26B 21/222; B26B 21/225; B26B 21/4012; B26B 21/4031
See application file for complete search history.

(56) References Cited

U.S. PATENT DOCUMENTS 4,587,729 A 5/1986 Jacobson
5,761,814 A 6/1998 Anderson et al.
(Continued)

FOREIGN PATENT DOCUMENTS

CN 1159779 A 9/1997
CN 126184 A 8/2000
(Continued)

OTHER PUBLICATIONS

International Search Report and Written Opinion for International Application No. PCT/JP2019/035477, mailed Oct. 8, 2019.
(Continued)

*Primary Examiner* — Adam J Eiseman
*Assistant Examiner* — Richard D Crosby, Jr.
(74) *Attorney, Agent, or Firm* — Wolf, Greenfield & Sacks, P.C.

(57) ABSTRACT

A razor head includes a frame including two opposing long side walls and two opposing short side walls, connectors each connecting two points of the frame in an interior of the frame, and elongated blades arranged on an inner side of the frame. The blades are coupled to only two of the connectors, the two connectors to which the blades are coupled connecting the two long side walls to each other. In a case where a position in the frame in a longitudinal direction is represented by a percentage, when a middle of the frame in the longitudinal direction is 0% and two ends of the frame in the longitudinal direction that correspond to inner surfaces of the two short side walls are 100%, the two connectors to which the blades are coupled are each arranged in a range from 30% to 90% between the middle and the two ends.

5 Claims, 7 Drawing Sheets

(56) References Cited

U.S. PATENT DOCUMENTS

| | | | | |
|---|---|---|---|---|
| 6,009,624 | A | 1/2000 | Apprille, Jr. et al. | |
| 6,035,537 | A * | 3/2000 | Apprille, Jr. | B26B 21/4068 30/346.5 |
| 7,100,284 | B2 * | 9/2006 | King | B26B 21/521 30/527 |
| 7,770,294 | B2 * | 8/2010 | Bruno | B26B 21/225 30/526 |
| 8,234,789 | B2 * | 8/2012 | Avens | B26B 21/225 30/52 |
| 9,193,078 | B2 * | 11/2015 | Worrick, III | B26B 21/14 |
| 9,308,657 | B2 | 4/2016 | Bruno | |
| 9,604,373 | B2 * | 3/2017 | Park | B26B 21/4012 |
| 10,391,652 | B2 * | 8/2019 | Bruno | B26B 21/4012 |
| 2009/0193659 | A1 * | 8/2009 | Park | B26B 21/225 30/527 |
| 2009/0293281 | A1 | 12/2009 | Bruno | |
| 2010/0175265 | A1 | 7/2010 | Bozikis et al. | |
| 2011/0146079 | A1 * | 6/2011 | Clarke | B26B 21/443 30/34.05 |
| 2013/0205595 | A1 | 8/2013 | Bykowski et al. | |
| 2014/0000114 | A1 | 1/2014 | Wester et al. | |
| 2014/0230252 | A1 * | 8/2014 | Davos | B26B 21/565 30/346.54 |
| 2015/0013169 | A1 | 1/2015 | Warrick | |
| 2016/0279815 | A1 | 9/2016 | Washington | |
| 2016/0279816 | A1 * | 9/2016 | Bruno | B26B 21/222 |
| 2016/0361827 | A1 * | 12/2016 | Bruno | B26B 21/4012 |
| 2017/0001323 | A1 | 1/2017 | Futura | |
| 2018/0311844 | A9 | 11/2018 | Bruno | |
| 2019/0160699 | A1 | 5/2019 | Park et al. | |
| 2019/0299457 | A1 * | 10/2019 | Long | B26B 21/4012 |
| 2020/0164536 | A1 | 5/2020 | Hashimoto | |
| 2022/0168915 | A1 | 6/2022 | Washington | |
| 2022/0258365 | A1 | 8/2022 | Hashimoto | |
| 2023/0158695 | A1 | 5/2023 | Long | |

FOREIGN PATENT DOCUMENTS

| | | | |
|---|---|---|---|
| CN | 102046340 | A | 5/2011 |
| CN | 107466264 | A | 12/2017 |
| CN | 109834739 | A | 6/2019 |
| EP | 2 823 941 | A1 | 1/2015 |
| EP | 3 072 647 | A1 | 9/2016 |
| JP | H10-506813 | A | 7/1998 |
| JP | 2002-510235 | A | 4/2002 |
| JP | 4346693 | B2 | 10/2009 |
| JP | 2011-520554 | A | 7/2011 |
| JP | 2013-099467 | A | 5/2013 |
| JP | 5313339 | B2 | 10/2013 |
| JP | 2015-100621 | A | 6/2015 |
| JP | 2018-511375 | A | 4/2018 |
| JP | 2019-022601 | A | 2/2019 |
| WO | WO 96/10473 | A | 4/1996 |
| WO | WO 99/16592 | A1 | 4/1999 |
| WO | WO 2016/153798 | A1 | 4/1999 |
| WO | WO 2008/002069 | A1 | 1/2008 |
| WO | WO 2009/146230 | A1 | 12/2009 |
| WO | WO 2019/190836 | A1 | 10/2019 |

OTHER PUBLICATIONS

International Search Report and Written Opinion for International Application No. PCT/JP2019/035478, mailed Oct. 8, 2019.

Extended European Search Report for European Application No. 19939957.7 dated Jun. 30, 2023.

First Office Action for Chinese Application No. 201980098740.4, dated Feb. 24, 2023.

Extended European Search Report for European Application No. 19939658.1, dated Jun. 30, 2023.

Non-Final Office Action for U.S. Appl. No. 17/630,661, mailed Jan. 31, 2024.

PCT/JP2019/035477, Oct. 8, 2019, International Search Report and Written Opinion.

PCT/JP2019/035478, Oct. 8, 2019, International Search Report and Written Opinion.

EP19939957.7, Jun. 30, 2023, Extended European Search Report.

* cited by examiner

RAZOR HEAD

RELATED APPLICATIONS

This application is a national stage filing under 35 U.S.C. § 371 of International Patent Application Serial No. PCT/JP2019/035478, filed Sep. 10, 2019, which claims priority to Japanese application number 2019-141292, filed Jul. 31, 2019, and Japanese application number 2019-158480 filed on Aug. 30, 2019, each of which is incorporatd herein by reference in their entirety.

TECHNICAL FIELD

The present disclosure relates to a razor head.

BACKGROUND ART

Patent Literature 1 discloses a razor head.

FIG. 12 shows a typical razor head 60. The razor head 60 includes a frame 61 with a rectangular outer form, three connectors 62 each connecting two points of the frame 61 in the interior of the frame 61, and elongated blades (not shown) coupled to the connectors 62. Each connector 62 includes pegs 64 (projections). Each blade is held between adjacent ones of the pegs 64.

CITATION LIST

Patent Literature

Patent Literature 1: Japanese Patent No. 5313339

SUMMARY OF INVENTION

Technical Problem

The blades of the razor head 60 in FIG. 12 are held by the three connectors 62 including a middle portion of the frame 61 in the longitudinal direction. The frame 61 further includes holders 63*a* on the inner sides of two short side walls 63 that are respectively located at the two ends of the frame 61 in the longitudinal direction. The holders 63*a* hold the blades. Thus, the flow resistance of fluids flowing inside the frame 61 tends to increase. If the number of the connectors 62 is reduced in order to lower the flow resistance, foreign matter (e.g., beard trimmings) is easily removed. However, the blades are supported at a smaller number of positions. This causes the blades to be easily bent and thus results in other inconveniences. Further, if the blades are supported at a larger number of positions in order to limit the flexing of the blades, the flow resistance of liquids increases so that foreign matter is removed in an unsmooth manner. It is an objective of the present disclosure to provide a razor head that reduces the flow resistance of fluids flowing on the inner side of the frame and limits the flexing of blades.

Solution to Problem

A razor head according to an aspect of the present disclosure includes a frame including two opposing long side walls and two opposing short side walls, an entirety of the frame having a rectangular outer form, connectors each connecting two points of the frame in an interior of the frame, and elongated blades arranged on an inner side of the frame. The blades are coupled to only two of the connectors, the two connectors to which the blades are coupled connecting the two long side walls to each other. In a case where a position in the frame in a longitudinal direction is represented by a percentage, when a middle of the frame in the longitudinal direction is 0% and two ends of the frame in the longitudinal direction that correspond to inner surfaces of the two short side walls are 100%, the two connectors to which the blades are coupled are each arranged in a range from 30% to 90% between the middle and the two ends.

DESCRIPTION OF EMBODIMENTS

In the description and claims, the terms "first," "second," and the like are used to distinguish similar components. These terms are not necessarily used to represent a specific sequential or chronological order. In the description and claims, the terms "left," "right," "front," "back," "bottom (surface)," "side (wall)," "upper," "lower," and the like are used to indicate a relative position or structure for illustrative purposes and do not indicate a permanent position or a position when a razor head is used.

A razor head according to an embodiment will now be described.

Figure 1:
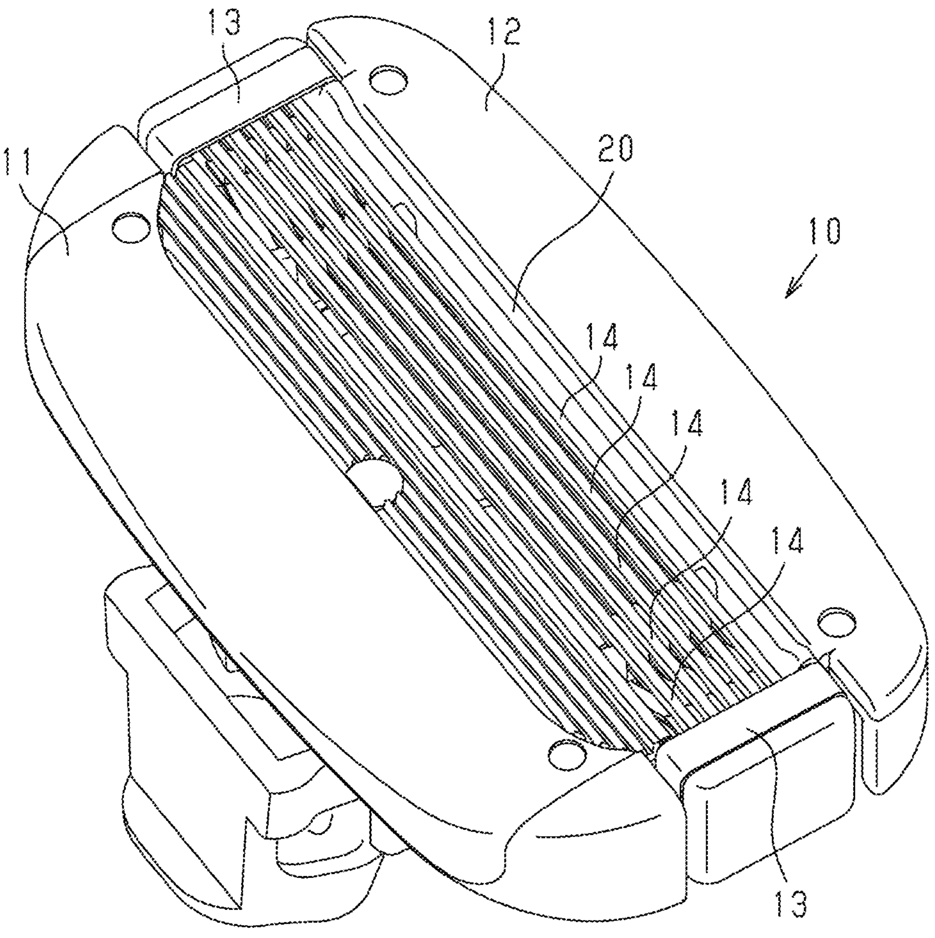
FIG. 1 is a perspective view of a razor head according to an embodiment.
Figure 2:
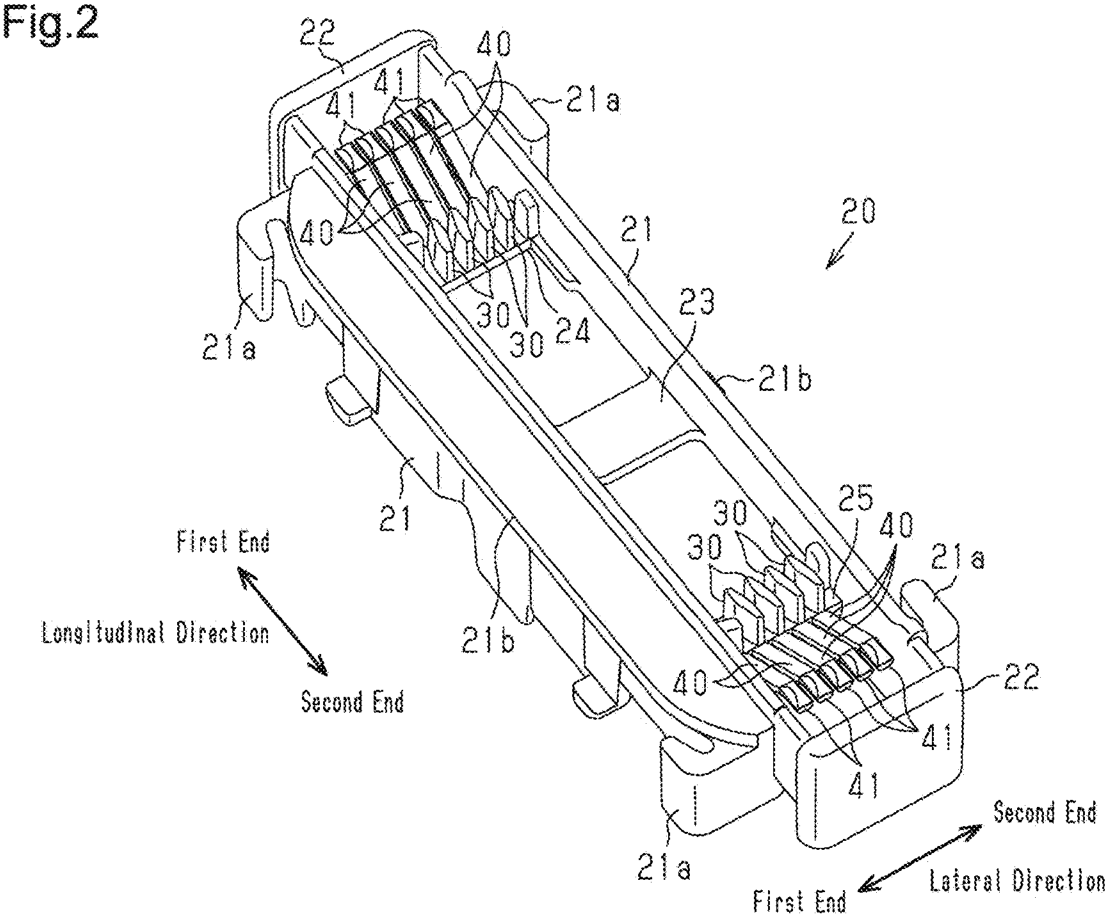
FIG. 2 is a perspective view of the frame of the razor head shown in FIG. 1.

FIGS. 1 and 2 show a razor head 10 that is coupled to a holder (not shown) and used as a razor. The razor head 10 includes a frame 20 with a rectangular outer form, a front member (lower member) 11, and a rear member (upper member) 12.

Unless otherwise specified, the longitudinal direction of the frame 20 is hereinafter simply referred to as the longitudinal direction and the lateral direction of the frame 20 is simply hereinafter referred to as the lateral direction. The first end of the frame 20 in the longitudinal direction is referred to as the left end. The second end of the frame 20 in the longitudinal direction is referred to as the right end. The lateral direction also indicates a direction in which the razor head 10 moves relative to the skin when the razor head 10 is used. The first end of the frame 20 in the lateral direction is referred to as the front end. The second end of the frame 20 in the lateral direction is referred to as the rear end. When the razor head 10 is used, the front end of the razor head 10 is located frontward from the rear end in a direction in which the razor head 10 travels. Further, the direction that is orthogonal to the longitudinal direction and the lateral direction of the frame 20 is referred to as the axial direction or the up-down direction. The direction extending from the sheet of FIG. 3 toward a person viewing the drawing is referred to as the upward direction, and its opposite direction is referred to as the downward direction.

Elongated blades 14 extending in the longitudinal direction are arranged on the inner side of the frame 20. The arrangement direction of the blades 14 corresponds to the lateral direction (front-rear direction) of the frame 20. For example, five blades 14 are arranged in the lateral direction at substantially equal intervals. The number of the blades 14 may be changed. There may be two to four blades 14 or may be six or more blades 14.

The front member 11 is coupled to the frame 20 along the front end of the frame 20. The rear member 12 is coupled to the frame 20 along the rear end of the frame 20. The front member 11 may include a shaving aid or a beard softener containing water-soluble components or function to pull a skin surface or raise beards. The rear member 12 may include a shaving aid or a moisturizer for skin that contains water-soluble components.

The razor head 10 includes two covers 13 that are coupled to two ends of the frame 20 in the longitudinal direction, respectively. The two covers 13 cover the two ends of each blade 14, respectively. The covers 13 restrict the blades 14 from moving upward. The razor head 10 has a substantially rectangular outer form in plan view in a state where the front member 11, the rear member 12, and the covers 13 are coupled to the frame 20. The rectangle includes four chamfered corners and four arcuate sides that are gentler than the four corners.

The frame 20 will now be described.

Figure 3:
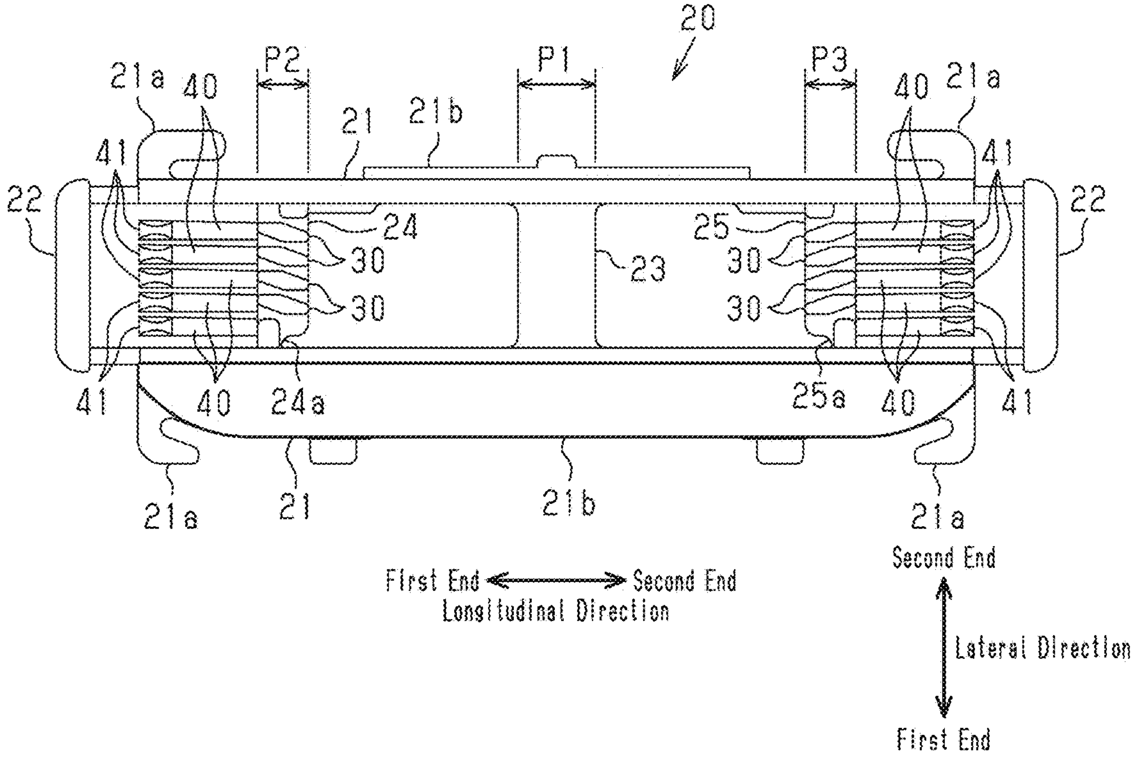
FIG. 3 is a plan view of the frame shown in FIG. 2.

As shown in FIGS. 2 and 3, the frame 20 includes two opposing long side walls 21 and two opposing short side walls 22. Thus, the entire frame 20 has a rectangular outer form. The thickness direction of each long side wall 21 corresponds to the lateral direction of the frame 20. Each long side wall 21 includes two hook-shaped projections 21*a* that protrude outward of the frame 20. The two projections 21*a* are each arranged on the two ends of the corresponding long side wall 21 in the longitudinal direction. Each long side wall 21 includes a thick portion 21*b* located between the two projections 21*a*. The thick portion 21*b* is partially increased in thickness.

The front member 11 and the rear member 12 of the razor head 10 each include an engagement piece (not shown) and a contact portion (not shown). When the front member 11 and the rear member 12 are coupled to the frame 20, each engagement piece engages the corresponding projection 21*a* and each contact portion contacts the thick portion 21*b*. In the present embodiment, the two long side walls 21 (more specifically, the projections 21*a* and the thick portions 21*b*) each have a different shape in correspondence with the front member 11 or the rear member 12. In some examples, the two long side walls 21 may have the same shape.

The above-described “rectangular outer form” does not indicate only a rectangular outer form in a strict sense. Instead, the above-described “rectangular outer form” includes, for example, an outer form that is entirely substantially rectangular while having a shape including the projections 21*a* and the thick portions 21*b*.

The frame 20 includes a first connector 23, a second connector 24, and a third connector 25. The first, second, and third connectors 23, 24, 25 each extend in the lateral direction to connect two points of the frame 20 in the interior of the frame 20. The two long side walls 21 each include a middle portion in the longitudinal direction. The first connector 23 connects the middle portions to each other. The second connector 24 and the third connector 25 are respectively arranged on opposite sides of the first connector 23 to connect the two long side walls 21. That is, multiple (e.g., three) connectors parallel to each other are arranged on the inner side of the frame 20. The second connector 24 is located closer to the first end of the frame 20 in the longitudinal direction than the first connector 23. The third connector 25 is located closer to the second end of the frame 20 in the longitudinal direction than the first connector 23.

As shown in FIG. 3, lengths P1, P2, P3 of the first, second, and third connectors 23, 24, 25 in the longitudinal direction of the long side walls 21 correspond to the widths of the first, second, and third connectors 23, 24, 25, respectively. P1 is greater than P2 and P3. When the razor head 10 pivots (swings) relative to its grip, the first connector 23 is involved in the pivoting (swinging) and is not involved in retaining of the blade 14. Thus, the frame 20 does not have to include the first connector 23.

The second connector 24 and the third connector 25 include narrow portions 24*a* and 25*a*, respectively. The narrow portions 24*a* and 25*a* are connected to a long side wall 21. The narrow portions 24*a* and 25*a* are shorter in the longitudinal direction than the other portions of the second connector 24 and the third connector 25. That is, the second connector 24 and the third connector 25 have a narrow width at the narrow portions 24*a* and 25*a*, respectively.

The dimensions of the narrow portions 24*a* and 25*a* are not particularly limited. For example, the dimensions of the narrow portions 24*a* and 25*a* are smaller than width P2 of the second connector 24 and width P3 of the third connector 25 by 0.2 mm to 1.0 mm. In other words, the narrow portions 24*a* and 25*a* may be recessed from the other portions by 0.2 mm to 1.0 mm.

Figure 4:
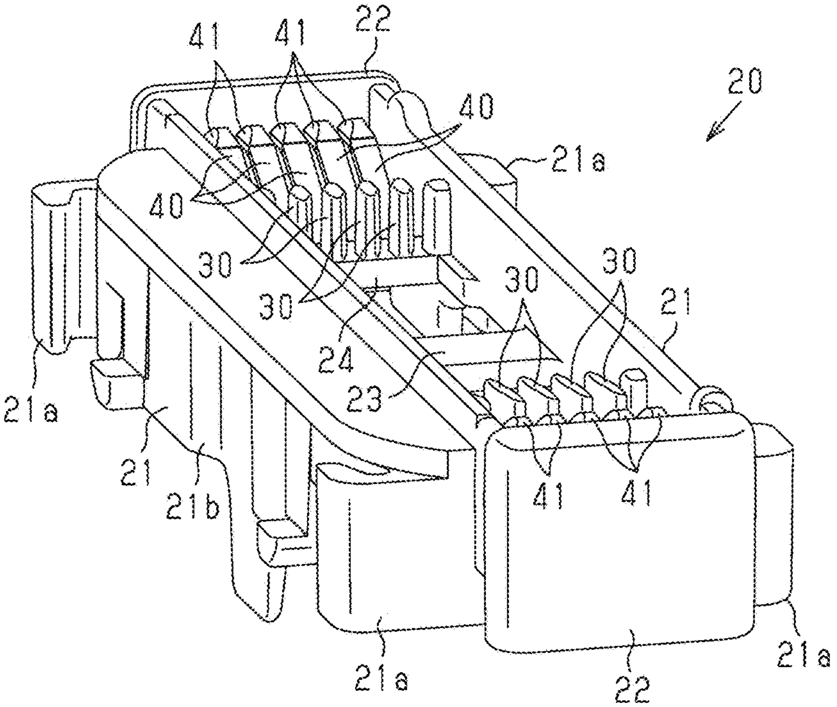
FIG. 4 is a perspective view of the frame shown in FIG. 2.

As shown in FIGS. 2 to 4, the second connector 24 and the third connector 25 each include multiple (e.g., four) projections 30 that protrude in the thickness direction (upward direction) of the walls. The four projections 30 are each arranged in a row in the lateral direction. The second connector 24 and the third connector 25 may include the same number of projections 30. The projections 30 of each of the second connector 24 and the third connector 25 may have the same shape.

The first connector 23 does not include the projections 30 used to couple the blades 14. That is, the first connector 23 does not correspond to a connector used to couple the blades 14, and the second connector 24 and the third connector 25 each correspond to a connector used to couple the blades 14.

Leaf springs 40 protrude from the second connector 24 in the longitudinal direction away from the third connector 25. The leaf springs 40 are arranged in the lateral direction. Leaf springs 40 protrude from the third connector 25 in the longitudinal direction away from the second connector 24. The leaf springs 40 are arranged in the lateral direction. In other words, the leaf springs 40 of the second connector 24 protrude toward the first end of the frame 20 in the longitudinal direction. The leaf springs 40 of the third connector 25 protrude toward the second end of the frame 20 in the longitudinal direction.

The second connector 24 and the third connector 25 are symmetrical with respect to the first connector 23. Likewise, the projections 30 and the leaf springs 40 of the second connector 24 and the projections 30 and the leaf springs 40 of the third connector 25 are symmetrical with respect to the first connector 23. Thus, the projections 30 and the leaf springs 40 of the third connector 25 will hereinafter be described, and those of the second connector 24 will not be described.

The projections 30 will now be described.

Figure 5A:
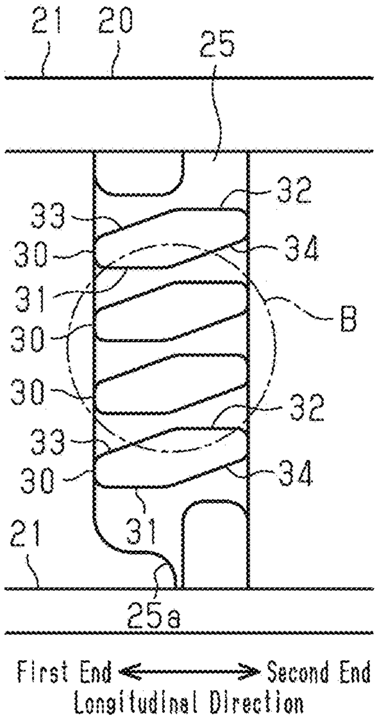
FIG. 5(A) is an enlarged view of a connector of the frame shown in FIG. 3.
Figure 5B:
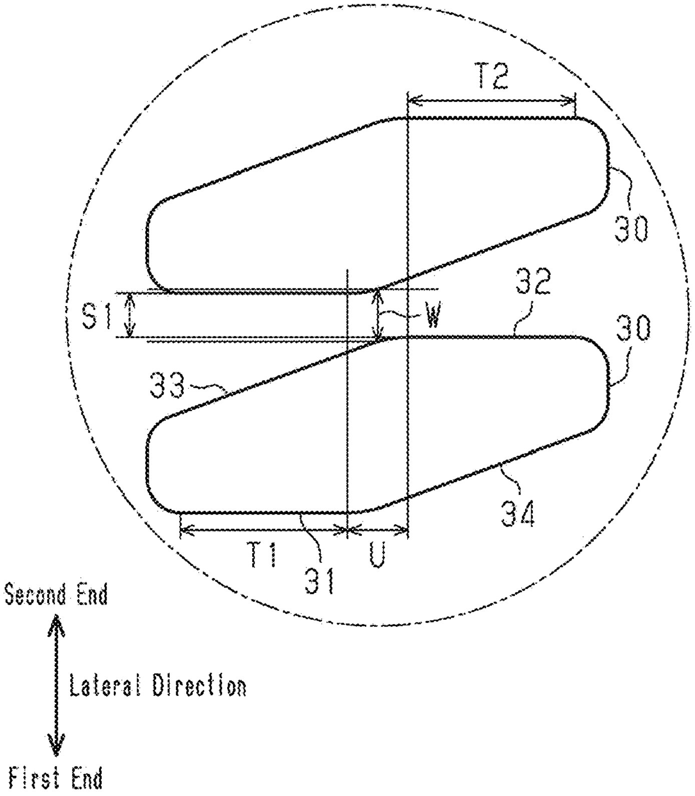
FIG. 5(B) is an enlarged view showing part of FIG. 5(A).

FIG. 5(A) is a horizontal cross-sectional view of the projections 30 that are cut by a cut surface orthogonal to the protruding directions of the projections 30. FIG. 5(B) is an enlarged view of the section encircled by the alternate long and short dashed line in FIG. 5(A). The horizontal cross-sectional shape of each projection 30 is generally parallelogrammatic with four curved corners. Each projection 30 includes first and second flat surfaces 31, 32 that extend in the longitudinal direction and third and fourth flat surfaces 33, 34 that are inclined with respect to the first and second flat surfaces 31, 32. The first and second flat surfaces 31, 32 are a set of opposite sides parallel to each other. The third and fourth flat surfaces 33, 34 are another set of opposite sides parallel to each other.

The first and second flat surfaces 31, 32 are respectively in contact with the front blade 14 (the blade 14 on one side in the arrangement direction) and the rear blade 14 (the blade 14 on the other side in the arrangement direction). The frame 20 may include a support protrusion having a distal end surface that is a flat surface parallel to each first flat surface 31 or each second flat surface 32. The support protrusion is located in the lateral direction next to the projections 30 on the two ends in the arrangement direction. In this case, the blades 14 on the two ends in the arrangement direction are supported by the first flat surfaces 31 of the projections 30 or the second flat surfaces 32 of the projections 30 and by the distal end surface of the support protrusion.

The first flat surface 31 is a front surface of the projection 30. The second flat surface 32 is a rear surface of the projection 30. The third flat surface 33 is inclined toward the left rear. The fourth flat surface 34 is inclined toward the right front.

As viewed in the lateral direction, the first flat surfaces 31 on the third connector 25 are located on the same position. As viewed in the lateral direction, the second flat surfaces 32 on the third connector 25 are located on the same position. In other words, the four first flat surfaces 31 on the third connector 25 are located on the same position in the longitudinal direction and the four second flat surfaces 32 on the third connector 25 are located on the same position in the longitudinal direction.

There is a gap S1 between the first flat surface 31 and the second flat surface 32 that hold each blade 14 (hereinafter also referred to as the gap between flat surfaces). Each blade 14 is inserted into the gap S1 so that the corresponding two projections 30 hold the blade 14. This causes the blade 14 to be coupled to the third connector 25.

The term "hold" does not only indicate a state in which two projections 30 hold the blade 14 so as to be immovable in the axial direction, but also indicate a state in which two projections 30 hold the blade 14 so as to be slidable in the axial direction. For example, during use of the razor, the pressure produced by the blade 14 pressing the skin may cause the blade 14 to slide in the axial direction.

The gap S1 may be changed in correspondence with the thickness of the blade 14. For example, the gap S1 may range from 0.025 mm to 1.0 mm or may range from 0.1 mm to 0.5 mm. When the gap S1 falls within these value ranges, the blade 14 having a thickness of approximately 0.02 mm to 0.96 mm is easily inserted into the gap S1 and easily held by the projections 30.

Length T1 of the first flat surface 31 in the longitudinal direction is equal to length T2 of the second flat surface 32 in the longitudinal direction. The first flat surface 31 and the second flat surface 32 that are in contact with each blade 14 are shifted from each other in the longitudinal direction so as not to overlap each other as viewed in the lateral direction. In other words, the first flat surface 31 and the second flat surface 32 of each projection 30 are shifted from each other in the longitudinal direction so as not to overlap each other as viewed in the lateral direction. Thus, the first flat surface 31 and the second flat surface 32 that hold each blade 14 do not oppose each other in a state where the blade 14 is removed.

Length T1 of the first flat surface 31 and length T2 of the second flat surface 32 may be changed. For example, T1 and T2 may range from 0.2 mm to 2.0 mm or may range from 0.3 mm to 1.4 mm. Length T1 may be equal to or different from length T2.

As shown in FIG. 5, since each first flat surface 31 and the corresponding second flat surface 32 are shifted from each other so as not to overlap each other in the longitudinal direction, a minimum interval W between adjacent ones of the projections 30 in the lateral direction (hereinafter referred to as the minimum interval between projections) is greater than the gap S1.

FIG. 5 shows a separation distance U between the second flat surface 32 of one of adjacent two projections 30 and the first flat surface 31 of the other projection 30 in the longitudinal direction (hereinafter also referred to as the separation distance between two flat surfaces. The separation distance U may be changed. For example, the separation distance U may range from 0.01 mm to 1.0 mm or may range from 0.05 mm to 0.8 mm. The separation distance U falling within these value ranges shifts the first flat surface 31 and the second flat surface 32 from each other so as not overlap each other in the longitudinal direction and relatively reduces width P3 of the third connector 25.

The leaf springs 40 will now be described.

As shown in FIGS. 3 and 4, the third connector 25 includes five leaf springs 40. Each of the leaf springs 40 is a plate member extending in the longitudinal direction. The leaf spring 40 includes a basal end connected to the third connector 25 and a distal end protruding in a direction away from the second connector 24. More specifically, the distal end of the leaf spring 40 protrudes upward as the distal end becomes farther from the basal end of the leaf spring 40. Thus, the leaf spring 40 is inclined with respect to the longitudinal direction. The distal end of the leaf spring 40 is a free end. This allows the leaf spring 40 to be elastically deformable in the axial direction.

When the frame 20 is seen from above, each leaf spring 40 is slightly inclined such that its distal end is closer to the second end in the lateral direction than its basal end. In other words, the direction in which the leaf spring 40 extends is slightly inclined with respect to the longitudinal direction such that the distal end is located on the rear side of the basal end.

The distal end of each leaf spring 40 includes a protrusion 41 that protrudes upward. As described below, the protrusion 41 is a support that supports the blade 14.

The mechanism of the frame 20 retaining the blade 14 will now be described.

Figure 6:
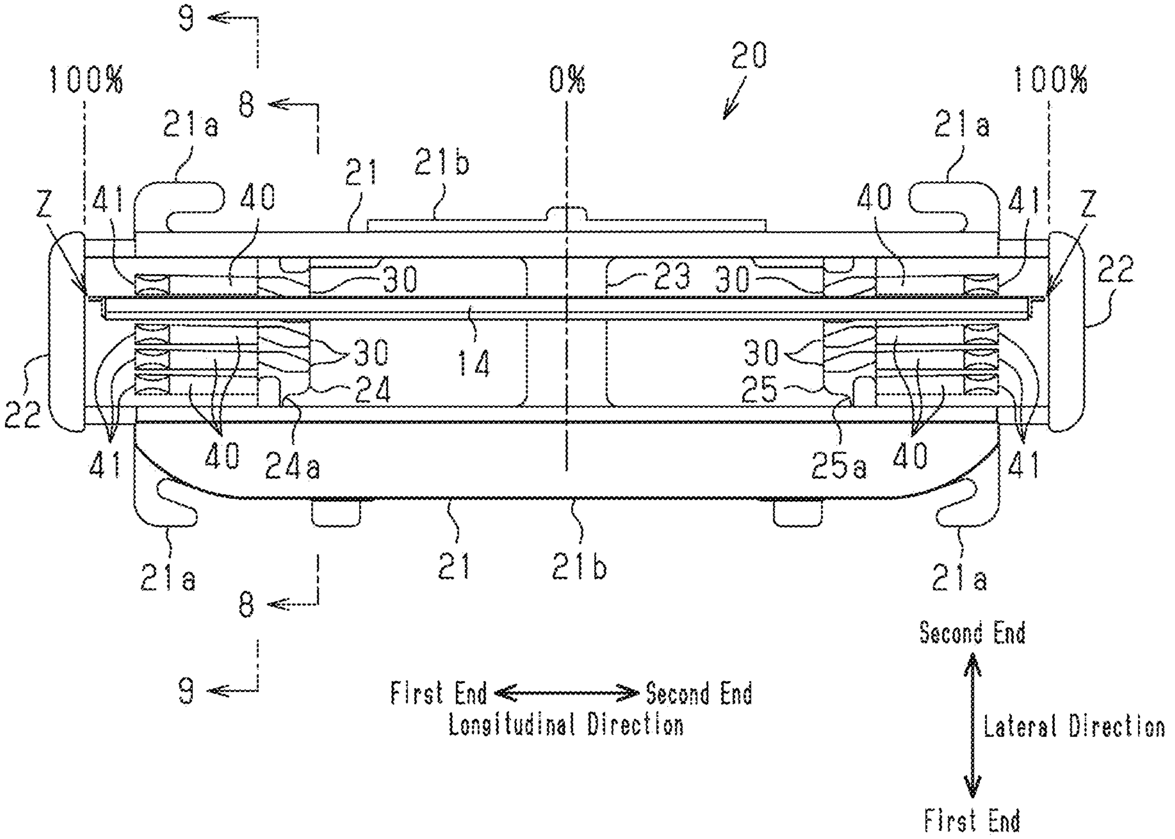
FIG. 6 is a plan view of the frame in FIG. 3 to which one blade is coupled.
Figure 7:
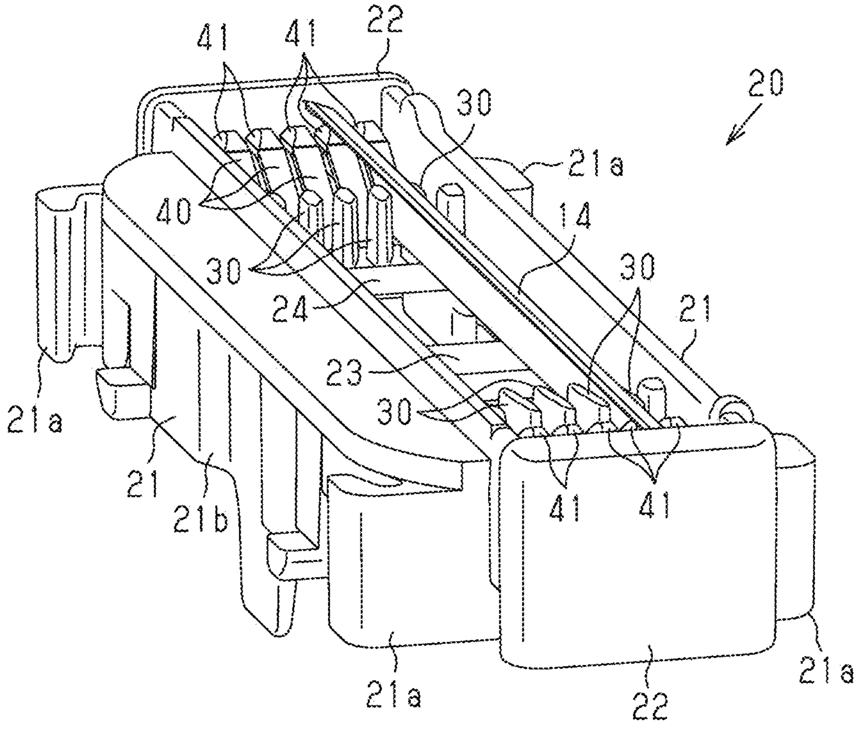
FIG. 7 is a perspective view of the frame shown in FIG. 6.

Referring to FIGS. 6 and 7, each of the second connector 24 and the third connector 25 retains the blades 14 with four projections 30 arranged in the lateral direction. Each blade 14 is inserted into the gap between the flat surfaces of adjacent ones of the projections 30 in the lateral direction. Each blade 14 includes a first end in the longitudinal direction retained by the second connector 24 and a second end in the longitudinal direction retained by the third connector 25. Thus, in the present embodiment, the two connectors (i.e., second connector 24 and the third connector 25) retain the blades 14. FIGS. 6 and 7 show the frame 20 to which only one blade 14 is coupled.

Figure 8:
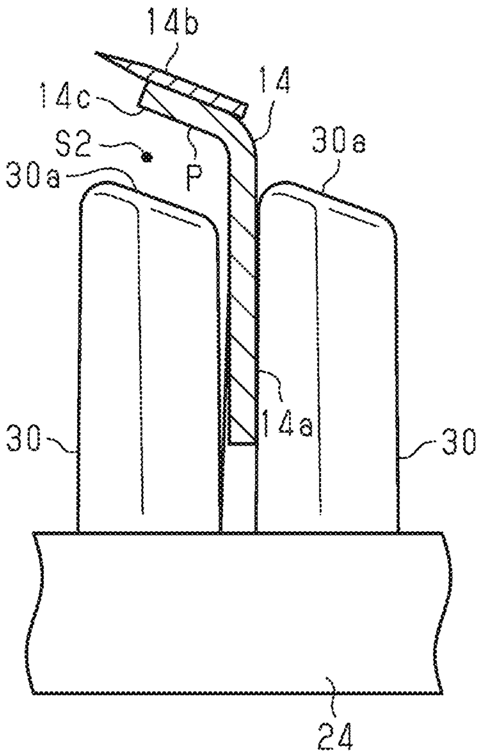
FIG. 8 is a cross-sectional view taken along line 8-8 of FIG. 6.
Figure 9:
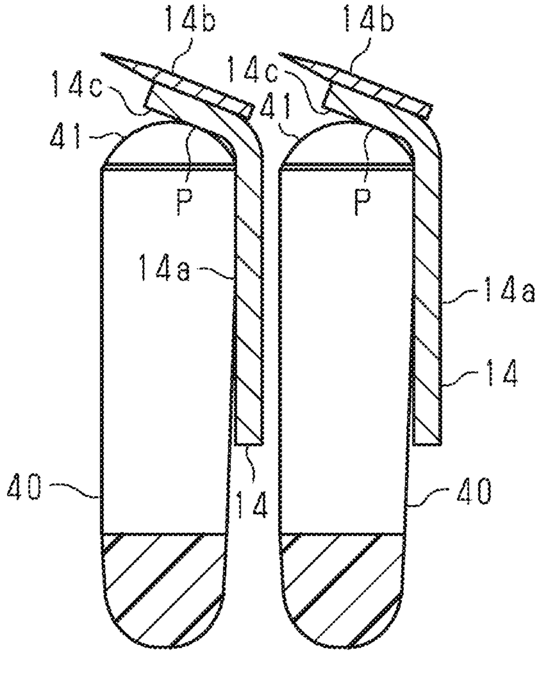
FIG. 9 is a cross-sectional view taken along line 9-9 of FIG. 6.

As shown in FIGS. 8 and 9, the blade 14 includes a plate-shaped body 14*a* held by the projections 30 and a blade portion 14*b* joined to the upper edge of the body 14*a*. The body 14*a* includes a bent portion (curved portion) 14*c* that is bent frontward. The blade portion 14*b* is joined to the bent portion 14*c*.

As shown in FIG. 9, when the blade 14 is inserted into the gap between the flat surfaces, a lower surface P of the bent portion 14*c* in the body 14*a* of the blade 14 is in contact with the protrusion 41 of the leaf spring 40. In other words, the blade 14 is supported by the protrusion 41 of the leaf spring 40.

As shown in FIG. 8, each projection 30 includes a distal end surface 30*a* that is a flat surface inclined with respect to the axial direction. The distal end surface 30*a* is substantially parallel to a lower surface of the blade portion 14*b*. The space between the lower surface P of the bent portion 14*c* and the distal end surface 30*a* of the projection 30 includes a gap S2. The blade 14 is permitted to move in the range of the gap S2 in the axial direction as the leaf spring 40 elastically deforms.

Since the distal end of each leaf spring 40 is slightly inclined rearward when the frame 20 is seen from above, the blade 14 supported by the leaf spring 40 is slightly biased toward the projection 30 located on the rear side of the blade 14. This allows the blade 14 to be retained more stably.

The material of the razor head 10 is not particularly limited. The razor head 10 made of resin (plastic) is excellent in moldability. Examples of the resin used as the material of the razor head 10 include ABS, polypropylene, polystyrene, polyacetal, and nylon.

The material of each blade 14 is not particularly limited. For example, the blade 14 may be made of metal, ceramics, or resin. Examples of the metal used as the material of the blade 14 include stainless steel and titanium. Examples of the ceramics used as the material of the blade 14 include zirconia, aluminum oxide, and silicon nitride. The resin used as the material of the blade 14 includes the same resin of the razor head 10.

The arrangement of the second connector 24 and the third connector 25 will now be described.

As shown in FIG. 3, the second connector 24 and the third connector 25 are located at positions excluding the middle and the two ends of the frame 20 in the longitudinal direction. In other words, the second connector 24 and the third connector 25 are located at positions separated from the middle portion of the frame 20 in the longitudinal direction and the two short side walls 22.

The arrangement of the second connector 24 and the third connector 25 is determined from the result of the following simulation.

Figure 11:
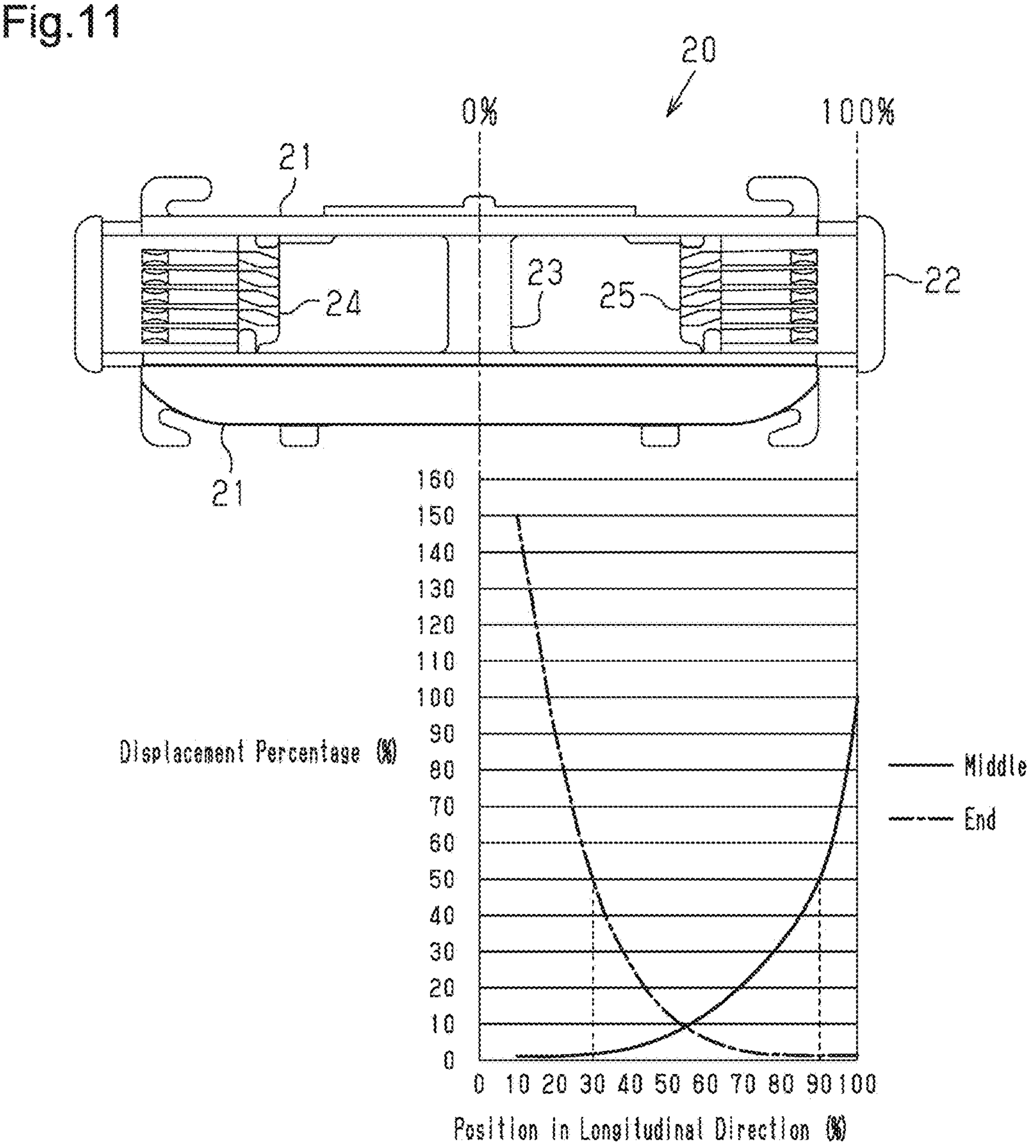
FIG. 11 is a graph showing the result of the simulation.
Figure 12:
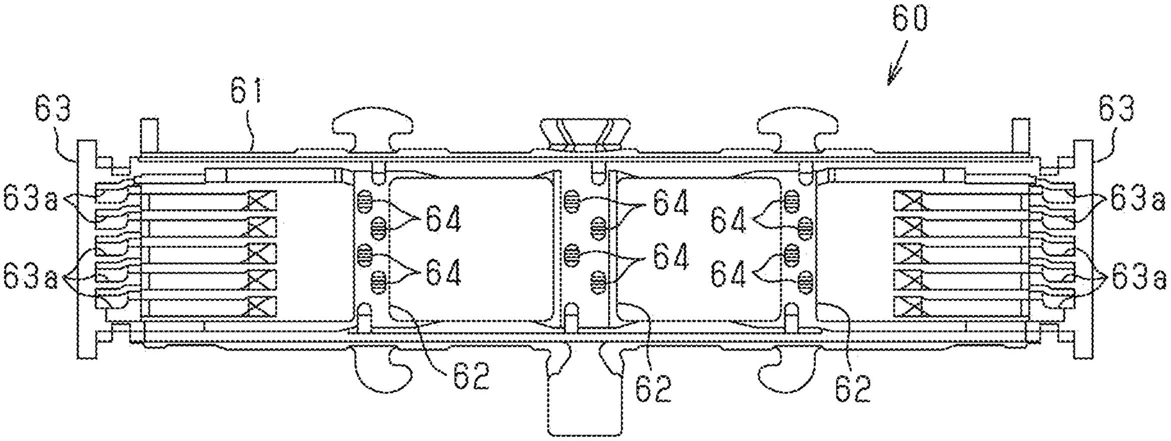
FIG. 12 is a plan view of a frame of a typical razor head.

As shown in FIG. 11, when the position in the frame 20 in the longitudinal direction is represented by a percentage, the position of the middle of the frame 20 in the longitudinal direction is 0% and the positions of the two ends of the frame 20 in the longitudinal direction (more specifically, the inner surfaces of the two short side walls 22) are 100%.

Figure 10:
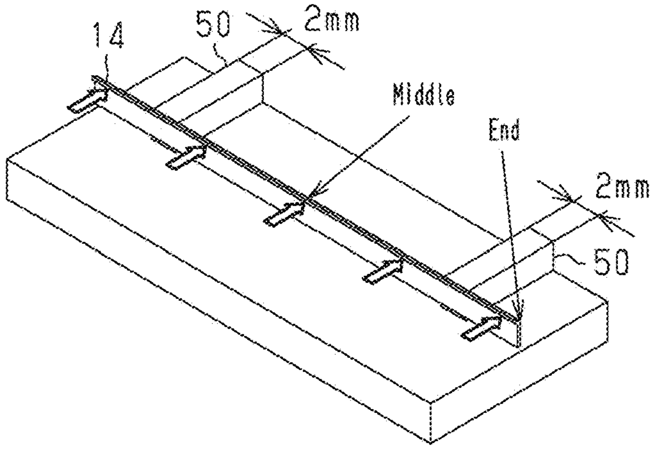
FIG. 10 is a schematic diagram of a simulation.

As shown in FIG. 10, plate members 50 each having a width of 2 mm are used in the simulation. The plate members 50 are respectively arranged at two positions that are separated from the middle toward the two ends of the blade 14 in the longitudinal direction by substantially equal distances. Further, each blade 14 is arranged in front of the plate members 50. A load acting in the direction shown by the arrows in FIG. 10, that is, a load acting rearward (acting in the thickness direction of the blade 14) is applied to the entire blade 14 in the longitudinal direction. Under such a condition, the displacement produced by the flexing of the middle and ends of the blade 14 was simulated. When the plate members 50 are respectively located at the two ends of the blade 14, a state in which the second connector 24 and the third connector 25 are arranged at the positions of 100% in the longitudinal direction of the frame 20 is reproduced.

More specifically, as shown in FIGS. 10 and 11, when each plate member 50 is arranged at the position of 100%, the displacement of the middle of the blade 14 is 100% and the displacement of the end of the blade 14 is 0%. With reference to the displacements, the displacement percentage of the blade 14 was calculated for the case of changing the position of the plate member 50 in the longitudinal direction.

As shown in the graph of FIG. 11, the simulation result indicates that the displacement percentages of the middle and the ends of the blade 14 were limited to 50% or smaller when the second connector 24 and the third connector 25 were arranged in the range from 30% to 90%. Further, the displacement percentages of the middle and the ends of the blade 14 were limited to 30% or smaller when the second connector 24 and the third connector 25 were arranged in the range from 40% to 70%. Furthermore, the displacement percentages of the middle and the ends of the blade 14 were limited to 20% or smaller when the second connector 24 and the third connector 25 were arranged in the range from 50% to 68%. Thus, it is preferred that the second connector 24 and the third connector 25 be arranged in the range from 40% to 70% and it is more preferred that the second connector 24 and the third connector 25 be arranged in the range from 50% to 68%. The arrangement in the range from 30% to 90% refers to a state in which the entire second connector 24 and the entire third connector 25 are included in the range from 30% to 90%. The same applies to the range from 40% to 70% and the range from 50% to 68%.

The simulation result shown in FIG. 11 indicates that the displacement of the blade 14 is minimized at approximately 55%. When the razor head 10 is used, beards are shaved at the middle of the razor head 10 more often than at the ends of the razor head 10. Thus, it is preferred that foreign matter (e.g., beard trimmings) be smoothly removed in the periphery of the razor head 10. Accordingly, it is preferred that the second connector 24 and the third connector 25 to which the blade 14 is coupled be located slightly outward (located closer to the ends). For example, it is preferred that the second connector 24 and the third connector 25 be arranged in the range from 50 to 68% (median is 59%).

Arranging the second connector 24 and the third connector 25 in this manner allows only the two connectors (i.e., second connector 24 and the third connector 25) to limit the flexing of the blade 14 in a favorable manner and holds the blade 14.

As shown in FIG. 6, the arrangement of the second connector 24 and the third connector 25 produces a space Z between each of the two ends of the blade 14 in the longitudinal direction and the corresponding one of the two short side walls 22. That is, the two ends of the blade 14 in the longitudinal direction are separated from the frame 20. Thus, as compared with when the two ends of the blade 14 in the longitudinal direction are respectively in contact with the two short side walls 22, the spaces Z through which fluids flow inside the frame 20 are wider. Even in a case where burrs are left at the body 14*a* or at the two ends of the blade portion 14*b* in the longitudinal direction, the spaces Z allow the blade 14 to be smoothly inserted into the gap between flat surfaces without being interfered by the burrs. Further, even in a case where the blade 14 moves in the axial direction as the leaf spring 40 elastically deforms, the blade 14 is prevented from contacting the inner surface of the frame 20.

Referring to FIG. 3, the entire width of the razor head 10 (the length of the razor head 10 from the first end to the second end in the longitudinal direction) may be changed. For example, the entire width may range from approximately 25 mm to 80 mm and may be about 41.5 mm. In correspondence with the dimension of the entire width of the razor head 10, the other dimensions may be enlarged or reduced at the same ratio (in a similar shape) and the ratio may be changed.

The length of the razor head 10 in the lateral direction (the length of the frame 20 in the lateral direction excluding the projections 21*a* and the thick portion 21*b*) may be changed. For example, the length of the razor head 10 in the lateral direction may range, for example, from approximately 4.0 mm to 12.0 mm and may be about 8.0 mm.

Width P2 of the second connector 24 and the width P3 of the third connector 25 may each range, for example, from approximately 1.6 mm to 4.0 mm and may be about 3.2 mm. Widths P2 and P3 may each be less than or equal to 10% of the entire width of the razor head 10. This allows fluids (e.g., beard trimmings, dead skin, or water containing shaving agent) to be smoothly discharged from the surface of the razor head 10 in contact with the skin (upper surface) toward the opposite surface (bottom surface).

The operation and advantages of the present embodiment will now be described.

(1) The blades 14 are coupled to only two of the connectors. In the case where the position of the frame 20 in the longitudinal direction is represented by a percentage, when the middle portion of the frame 20 in the longitudinal direction is 0% and the two ends of the frame 20 (i.e., the inner surfaces of the short side walls 22) in the longitudinal direction are 100%, the two connectors to which the blades 14 are coupled are arranged in the range from 30% to 90% between the middle portion and the two ends.

In this case, as compared with when the blades 14 are coupled to three or more connectors, the total number of projections 30 disposed at the connectors is relatively small. That is, while a larger number of the projections 30 is preferred for stably retaining the blades 14, a larger number of the projections 30 would increase the flow resistance of fluids flowing inside the frame 20. Setting two connectors to which the projections 30 are coupled reduces the flow resistance and stably retains the blades 14.

When the flow resistance of fluids flowing inside the frame 20 is small, foreign matter (e.g., beard trimmings, dead skin, or shaving agent) is smoothly discharged from the surface of the razor head 10 in direct contact with the skin toward the bottom surface, which is opposite from the skin contact surface. Thus, the razor head in direct contact with the user is kept clean (i.e., hygienic). This is also advantageous to the user. Further, when the two connectors to which the blades 14 are coupled are arranged at the positions in the range from 30% to 90% between the middle and the two ends, the flexing of the blades 14 is limited in a favorable manner and the blades 14 are retained. Thus, the beards are shaved in proper contact with the blades 14 without the blade edges escaping. This keeps each blade edge in contact with the skin in a favorable manner and thus continues to provide comfort to the user for a long period of time. Further, the flow resistance of fluids is reduced and the flexing of the blade 14 is limited.

(2) The second connector 24 and the third connector 25 include the narrow portions 24*a* and 25*a*, respectively. This reduces the flow resistance of fluids flowing inside the frame 20. Further, when an additional member (e.g., holder) is coupled to the razor head 10, the narrow portions 24*a* and 25*a* can be used as the space for coupling the additional member. This prevents the additional member from protruding in the width direction of the second connector 24 and the third connector 25. As a result, the additional member is prevented from increasing the flow resistance.

(3) The narrow portions 24*a* and 25*a* are portions where the second connector 24 and the third connector 25 are connected to the long side walls 21. This facilitates the flow of fluids along the inner edges of the long side walls 21 and thus further reduces the flow resistance of fluids.

(4) As the projections 30 of the second connector 24 are seen in the lateral direction, the first flat surfaces 31 are located at the same position and the second flat surfaces 32 are located at the same position. The projections 30 of the third connector 25 are arranged in the same manner.

This structure allows the projections 30 to retain the blades 14 evenly. More specifically, in the case of using a razor including blades, the blades tend to receive a load at the same position in the longitudinal direction. When the blades are evenly retained, the blades are flexed more evenly. This makes the feel of the shaver on the skin of the user more even and thus provides comfort to the user. Further, the blades are flexed more evenly so that the intervals between the blades are more even. If the intervals between the blades are partially narrow, the narrow parts tend to be clogged by, for example, beard trimmings, dead skin, or shaving agent. By preventing such clogging, the razor head in direct contact with the user is kept clean (i.e., hygienic). This is also advantageous to the user.

(5) The first flat surface 31 of one of adjacent two projections 30 in the lateral direction and the second flat surface 32 of the other one of the two projections 30 are shifted from each other in the longitudinal direction so as not to overlap each other. In this structure, the first flat surface 31 and the second flat surface 32 that hold each blade 14 do not oppose each other. Thus, as compared with a structure in which the first flat surface 31 and the second flat surface 32 oppose each other, the minimum interval W is relatively large. This limits clogging of foreign matter between adjacent ones of the projections 30. Even if the gap S1 is smaller than a reference value in a range of tolerance, the blade 14 is easily inserted into the gap between the flat surfaces.

(6) In the longitudinal direction of the blade 14, the first flat surface 31 and the second flat surface 32 of each projection 30 are equal to each other. This allows the opposite surfaces of the blade to be held in a substantially even manner.

Further, the minimum interval W is relatively large. This limits clogging of foreign matter between the projections 30. Furthermore, since the minimum interval W is large, a portion where the minimum interval W is provided is relatively large during production of a mold for forming the frame 20. This improves the strength of the mold.

(7) Each blade 14 is held by the first flat surface 31 of one of two projections 30 and the second flat surface 32 of the other one of the two projections 30. Thus, as compared with, for example, a structure in which the blade 14 is held by two curved surfaces, the blade 14 is held more stably. This keeps the blade edge in contact with the skin in a favorable manner and thus continues to provide comfort to the user for a long period of time. Further, wear in the projections 30 caused by shifting of the positions of the blade 14 is limited. Furthermore, chattering of the blade 14 caused by the wear of the projections 30 is limited. Chattering of the blade 14 makes the user uncomfortable. Thus, comfort is provided to the user also by limiting the chattering of the blade 14.

(8) Each projection 30 has a horizontal cross-sectional shape of a parallelogram. The third and fourth flat surfaces 33, 34 are inclined with respect to the moving direction (lateral direction) of the razor head 10. This reduces the flow resistance of solids or fluids (e.g., beard trimmings, dead skin, or shaving agent) in contact with the third and fourth flat surfaces 33, 34 and thus allows the solids or fluids to flow more quickly.

(9) The space Z is provided between each of the two ends of the blade 14 in the longitudinal direction and the corresponding one of the two short side walls 22. Thus, fluids (e.g., water) easily pass through the spaces Z inside the frame 20. Even if burrs are left, for example, at the body 14*a* or at the two ends of the blade portion 14*b* in the longitudinal direction, the spaces Z make the burrs non-interfering. This allows the blade 14 to be smoothly inserted into the gap between the flat surfaces. Further, even if the blade 14 moves in the axial direction as the leaf spring 40 elastically deforms, the blade 14 is prevented from contacting the inner surface of the frame 20.

(10) Each of the second connector 24 and the third connector 25 includes the leaf springs 40 that protrude in the direction away from the other one of the second connector 24 and the third connector 25. Each leaf spring 40 supports the corresponding blade 14. This allows the leaf spring 40 to support parts in the periphery of the two ends of the blade 14 in the longitudinal direction while leaving the space Z between each of the two ends of the blade 14 in the longitudinal direction and the corresponding one of the two short side walls 22. Further, the second connector 24 and the third connector 25 respectively support parts in the periphery of the two ends of the elongated blade 14 and thus further stabilizes the blade 14. Even when, for example, the blade 14 moves as the leaf spring 40 elastically deforms, the blade 14 is supported stably.

The present embodiment may be modified as follows. The present embodiment and the following modifications can be combined as long as they remain technically consistent with each other.

One or both of the narrow portions 24*a* and 25*a* of the second connector 24 may be omitted.

The narrow portions 24*a* and 25*a* do not have to be located at the positions of the above-described embodiment. For example, the narrow portions 24*a* and 25*a* may be located at the two ends of the second and third connectors 24, 25 in the longitudinal direction or may be located at positions separated from the ends.

As viewed in the lateral direction, the first flat surfaces 31 and the second flat surfaces 32 arranged in each bridge wall may partially overlap each other in the longitudinal direction. Even in this case, if the gap S1 is smaller than a reference value in a range of tolerance, each blade 14 is easily inserted into the gap between the flat surfaces by reducing the regions where the first flat surfaces 31 oppose the second flat surfaces 32.

The horizontal cross-sectional shape of each projection 30 may be changed. For example, the inclining direction of the third and fourth flat surfaces 33, 34 of each projection 30 may be reversed such that the second flat surface 32 of each projection 30 is closer to the middle of the frame 20 in the longitudinal direction than the first flat surface 31.

The horizontal cross-sectional shape of each projection 30 does not have to be parallelogrammatic. For example, the third flat surface 33 and the fourth flat surface 34 of each projection 30 do not have to be parallel to each other.

The third flat surface 33 and the fourth flat surface 34 of each projection 30 may be changed to curved surfaces recessed such that the middle portions of the curved surfaces become close to each other. In this case, since each projection 30 is relatively thin, the frame 20 is reduced in weight.

The third flat surface 33 and the fourth flat surface 34 of each projection 30 may be changed to curved surfaces bulged such that the middle portions of the curved surfaces are separated from each other. This facilitates the production of a mold. Further, since each projection 30 is relatively thick, the mechanical strength of the frame 20 improves.

In the third flat surface 33 and the fourth flat surface 34 of each projection 30, one of the surfaces may be a curved surface with a recessed middle portion and the other surface may be a curved surface with a bulged middle portion.

The two ends of the blades 14 in the longitudinal direction may be in contact with the two short side walls 22, respectively, Further, the two short side walls 22 may retain the two ends of the blades 14 in the longitudinal direction, respectively. Thus, the spaces Z do not have to be provided.

The number of the projections 30 of each of the second connector 24 and the third connector 25 may be changed to, for example, two, three, five, or more.

The frame 20 does not have to include the first connector 23. That is, the frame 20 may include only connectors that hold the blades 14.

Each of the second connector 24 and the third connector 25 may include leaf springs 40 that protrude in a direction closer to the other one of the second and third connectors 24 and 25.

The second connector 24 and the third connector 25 do not have to include the leaf springs 40. That is, the blades 14 may be fixed such that the blades 14 are immovable in the axial direction.

Each blade 14 may be an undivided component in which the body 14*a* and the blade portion 14*b* are integrally molded.

The invention claimed is:

1. A razor head, comprising:

a frame including two opposing long side walls and opposing first and second short side walls, an entirety of the frame having a rectangular outer form;

first, second, and third connectors each connecting two long side walls in an interior of the frame; and elongated blades arranged on an inner side of the frame, wherein the first connector connects a middle of the two long side walls to each other, the second connector and the third connector are symmetrical with respect to the first connector, the second and third connectors each include protrusions arranged in an arrangement direction of the blades, a length of each of the protrusions in a longitudinal direction of the frame is equal to the lengths of each of the second and third connectors in the longitudinal direction, each of the blades is held between adjacent protrusions of the second and third connector, thereby the blades are coupled to only the second and third connectors of the first, second, and third connectors, where a position in the frame in a longitudinal direction is represented by a percentage, the middle of the frame in the longitudinal direction is 0% and two ends of the frame in the longitudinal direction that correspond to inner surfaces of the first and second short side walls are each, respectively 100%, the second and third connectors, to which the blades are coupled are each arranged in a range from 30% to 90% between the middle of the frame and the two ends of the frame respectively, a length of the first connector in the longitudinal direction is greater than a length of the second connector in the longitudinal direction, the length of the first connector in the longitudinal direction is greater than a length of the third connector in the longitudinal direction, the second connector has a first narrow portion recessed from a side surface of the second connector facing the first connector and the third connector has a second narrow portion recessed from a side surface of the third connector facing the first connector, and the first and second narrow portions between the two long side walls are portions where the second and third connectors are connected to one of the long side walls.

2. The razor head according to claim 1, wherein a space is provided between the frame and each of two ends of the blades in the longitudinal direction.

3. The razor head according to claim 2, wherein each of the two connectors to which the blades are coupled includes leaf springs that protrude in a direction away from the other one of the connectors, and each of the leaf springs supports a corresponding one of the blades.

4. The razor head according to claim 1, wherein each of the protrusions includes:

a first flat surface that is in contact with one of the blades located on one side of the protrusion in the arrangement direction;

a second flat surface that is in contact with another of the blades located on the other side of the protrusion in the arrangement direction; and a third flat surface and a fourth flat surface that are inclined with respect to the first flat surface and the second flat surface;

wherein the first flat surface is parallel to the second flat surface, and wherein the third flat surface is parallel to the fourth flat surface.

5. The razor head according to claim 4, wherein in each of the second and third connectors, the first flat surface and the second flat surface are offset from each other in the longitudinal direction so as not to overlap each other as viewed in the arrangement direction, and the first flat surfaces are located on the same position as viewed in the arrangement direction and the second flat surfaces are located on the same position as viewed in the arrangement direction.

* * * * *